(12) United States Patent
Tasaka et al.

(10) Patent No.: US 7,857,728 B2
(45) Date of Patent: Dec. 28, 2010

(54) CONTROL APPARATUS FOR AUTOMATIC TRANSMISSION HAVING FAIL-SAFE FUNCTION DURING VEHICLE STOP

(75) Inventors: Hajime Tasaka, Fuji (JP); Hirofumi Michioka, Kanagawa (JP); Fumitaka Nagashima, Fuji (JP); Yutaka Tohyama, Fuji (JP); Jun Kagawa, Fuji (JP)

(73) Assignee: JATCO Ltd, Fuji-shi (JP)

( * ) Notice: Subject to any disclaimer, the term of this patent is extended or adjusted under 35 U.S.C. 154(b) by 745 days.

(21) Appl. No.: 11/850,753

(22) Filed: Sep. 6, 2007

(65) Prior Publication Data

US 2008/0058157 A1    Mar. 6, 2008

(30) Foreign Application Priority Data

Sep. 6, 2006 (JP) ............................. 2006-241431

(51) Int. Cl.
*B60W 10/04* (2006.01)
*G06F 7/00* (2006.01)

(52) U.S. Cl. ...................... 477/115; 477/906; 701/62

(58) Field of Classification Search ................ 477/115, 477/94, 906; 701/62
See application file for complete search history.

(56) References Cited

U.S. PATENT DOCUMENTS

| 4,843,551 A | * | 6/1989 | Milunas | 701/55 |
| 4,981,052 A | * | 1/1991 | Gierer | 477/125 |
| 5,088,353 A | * | 2/1992 | Yoshida | 477/92 |
| 5,409,434 A | | 4/1995 | Furukawa et al. | |
| 7,402,123 B2 | * | 7/2008 | Kobayashi et al. | 477/75 |
| 2007/0049457 A1 | | 3/2007 | Sato et al. | |

FOREIGN PATENT DOCUMENTS

| JP | 09-269062 A | 10/1997 |
| JP | 2000-240785 A | 9/2000 |
| JP | 2007-57057 A | 3/2007 |

OTHER PUBLICATIONS

English translation of JP09269062A, translated on Sep. 23, 2010.*

* cited by examiner

*Primary Examiner*—Roger Pang
(74) *Attorney, Agent, or Firm*—Foley & Lardner LLP

(57) ABSTRACT

A control apparatus for an automatic transmission including a plurality of frictional elements each arranged to be engaged by receiving supply of an engagement pressure regulated by a solenoid, and being arranged to attain a plurality of gear stages by combination of engagements of the frictional elements, the control apparatus includes a failure occurrence sensing section configured to sense an occurrence of a failure-induced disengagement in one of the frictional elements based on a failure of one of the solenoids, based on an engine racing by a depression of an accelerator pedal in a state in which ranges other than a parking range and a neutral range are selected during a stop of a vehicle; and a command output section configured to output a limp home mode command to attain one of the gear stages to enable the vehicle to start.

11 Claims, 6 Drawing Sheets

FIG.2

|  | LOW/C | 3-5R/C | H/C | L&R/B | 2-6/B | LOW/OWC |
|---|---|---|---|---|---|---|
| 1st | ○ |  |  | ⊗ |  | ● |
| 2nd | ○ |  |  |  | ○ |  |
| 3rd | ○ | ○ |  |  |  |  |
| 4th | ○ |  | ○ |  |  |  |
| 5th |  | ○ | ○ |  |  |  |
| 6th |  |  | ○ |  | ○ |  |
| Rev |  | ○ |  | ○ |  |  |

CONTROL APPARATUS FOR AUTOMATIC TRANSMISSION HAVING FAIL-SAFE FUNCTION DURING VEHICLE STOP

BACKGROUND OF THE INVENTION

This invention relates to a control apparatus having a fail-safe function for an automatic transmission of a vehicle, and more especially to a control apparatus which has a fail-safe function during a stop of a vehicle, and which is arranged to perform a fail-safe at the time of occurrence of a neutral failure during the stop of the vehicle.

In a control apparatus for an automatic transmission of a vehicle, engagement and disengagement of frictional elements are controlled by solenoids. In this apparatus, in a case in which the frictional elements to be engaged become the disengagement state by failure of the solenoid, a gear stage becomes a neutral stage, that is, a neutral failure is caused, to thereby make it impossible to restart a vehicle after the stop. A Published Japanese Patent Application Publication No. 2000-240785 shows a control apparatus which has a fail-safe function, and which is configured to command a gear stage attained by the engagements of the frictional elements other than the frictional element disengaged by the failure, and to be brought to a limp home mode to enable the vehicle to run to a service station.

SUMMARY OF THE INVENTION

The generation of the neutral failure during the vehicle running is sensed by comparison between a gear ratio set to the currently selected gear stage and an actual gear ratio. However, it is not possible to sense the neutral failure by the above-described method when the vehicle is stopped. Accordingly, in a case in which the neutral failure is generated by the failure of the solenoid for regulating the pressure of the frictional element to be engaged for attaining first speed, the vehicle can not be started by setting to command from the first speed in turn, and consequently the vehicle can not run.

It is, therefore, an object of the present invention to provide a control apparatus for an automatic transmission of a vehicle which has a fail-safe function during vehicle stop, and which is configured to detect the neutral failure at start, at the time of occurrence of neutral failure during the stop, and to enable the vehicle to rerun.

According to one aspect of the present invention, a control apparatus for an automatic transmission of a vehicle, the automatic transmission including a plurality of frictional elements each arranged to be engaged by receiving supply of an engagement pressure regulated by a solenoid, the automatic transmission being arranged to attain a plurality of gear stages by combination of engagements of the frictional elements, the control apparatus includes: a failure occurrence sensing section configured to sense an occurrence of a failure-induced disengagement in one of the frictional elements based on a failure of one of the solenoids, based on an engine racing by a depression of an accelerator pedal in a state in which ranges other than a parking range and a neutral range are selected during a stop of the vehicle; and a command output section configured to output a limp home mode command to attain one of the gear stages to enable the vehicle to start at the time of the occurrence of the failure-induced disengagement.

According to another aspect of the invention, a control apparatus for an automatic transmission of a vehicle, the automatic transmission including solenoids each arranged to generate a shift control pressure, pressure regulating valves each arranged to regulate an engagement pressure by using the shift control pressure from one of the solenoids as an operation signal pressure, and a plurality of frictional elements each arranged to be engaged by receiving supply of the engagement pressure from the one of the pressure regulating valves, the automatic transmission being arranged to attain a plurality of gear stages by combination of engagements of the frictional elements, the control apparatus includes: a failure occurrence sensing section configured to sense an occurrence of a failure-induced disengagement in one of the frictional elements based on a failure of one of the solenoids, based on an engine racing by a depression of an accelerator pedal in a state in which ranges other than a parking range and a neutral range are selected during a stop of the vehicle; and a command output section configured to output a limp home mode command to attain one of the gear stages to enable the vehicle to start at the time of the occurrence of the failure-induced disengagement.

According to still another aspect of the invention, a control method for an automatic transmission of a vehicle, the automatic transmission including solenoids each arranged to generate a shift control pressure, pressure regulating valves each arranged to regulate an engagement pressure by using the shift control pressure from one of the solenoids as an operation signal pressure, and a plurality of frictional elements each arranged to be engaged by receiving supply of the engagement pressure from the one of the pressure regulating valves, the automatic transmission being arranged to attain a plurality of gear stages by combination of engagements of the frictional elements, the control method includes: sensing an occurrence of a failure-induced disengagement in one of the frictional elements based on a failure of one of the solenoids, based on an engine racing by a depression of an accelerator pedal in a state in which ranges other than a parking range and a neutral range are selected during a stop of the vehicle; and outputting a limp home mode command to attain one of the gear stages to enable to the vehicle to start at the time of the occurrence of the failure-induced disengagement.

BRIEF DESCRIPTION OF THE DRAWINGS

FIG. 2 is a view showing combination of engagements of frictional elements.

DETAILED DESCRIPTION OF THE INVENTION

Figure 1:
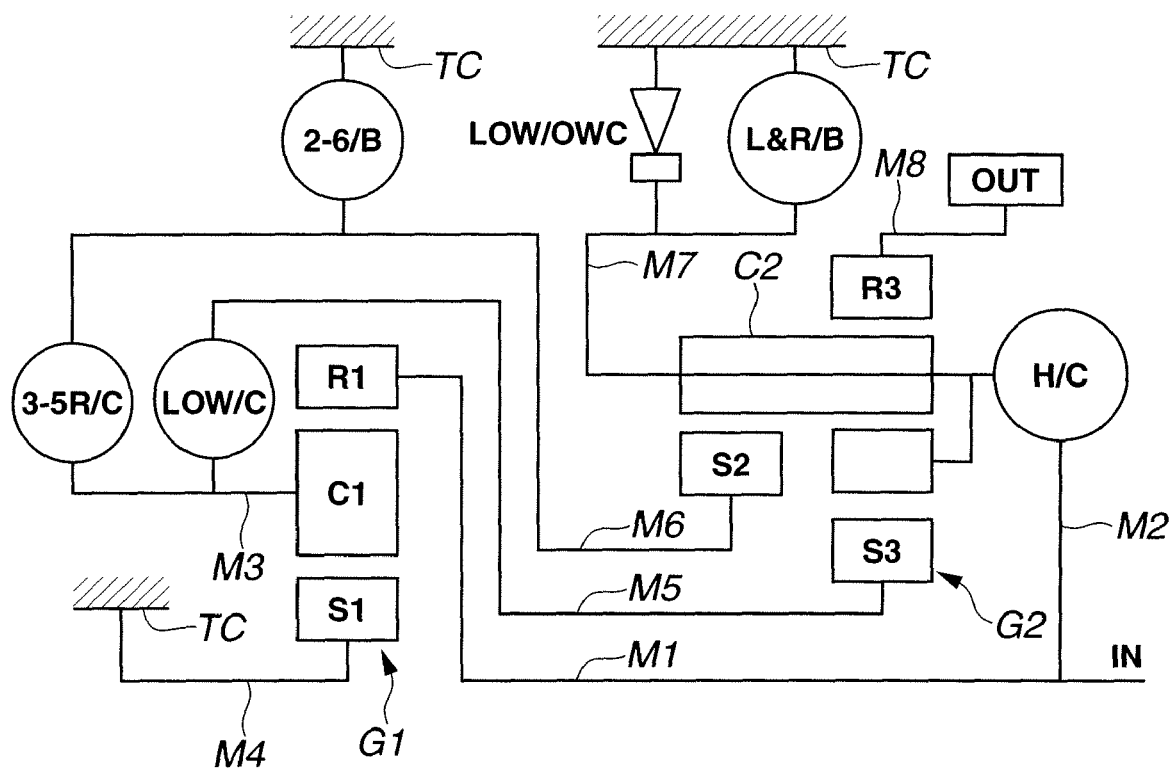
FIG. 1 is a skeleton diagram showing a gear train of an automatic transmission which can employ a control apparatus according to the present invention.

Hereinafter, embodiments according to the present invention will be illustrated in detail. FIG. 1 is a skeleton diagram showing a gear train of an automatic transmission which can employ a control apparatus according to the present invention. This gear train is shown by U.S. Patent Application Publication No. 2007/0049457 (corresponding to Published Japanese Patent Application Publication No. 2007-057057) by the applicant. This document is hereby incorporated by reference, and the detailed description will be omitted. The gear train includes a planetary gear set G1 and a Ravigneaux type planetary gear train G2, and includes, as frictional elements, a low clutch LOW/C, a high clutch H/C, a 3-5 reverse clutch 3-5R/C, a 2-6 brake 2-6/B, a low and reverse brake L&R/B, and a low one-way clutch LOW/OWC. It is possible to attain gear stages (gear speeds) of forward six speeds and reverse speed by combination of engagements and disengagements of these frictional elements.

FIG. 2 shows a combination of the engagements and the disengagements. That is, a first speed 1st is attained by engagement of low clutch LOW/C, and engagement of low and reverse brake L&R/B or engagement of low one-way clutch LOW/OWC. A second speed 2nd is attained by engagement of low clutch LOW/C and engagement of 2-6 brake 2-6/B. A third speed 3rd is attained by engagement of low clutch LOW/C and engagement of 3-5 revere clutch 3-5R/C. A fourth speed 4th is attained by engagement of low clutch LOW/C and engagement of high clutch H/C. A fifth speed 5th is attained by engagement of 3-5 reverse clutch 3-5R/C and engagement of high clutch H/C. A sixth speed 6th is attained by engagement of high clutch H/C and engagement of 2-6 brake 2-6/B. A reverse (Rev) is attained by engagement of 3-5 reverse clutch 3-5R/C and engagement of low and reverse brake L&R/B. In FIG. 2, a cell with circle denotes the engagement, and a cell with no sign denotes the disengagement. A cell with cross in circle denotes the engagement carried out during the engine brake. A filled circle denotes mechanical engagement (restrained rotation) carried out only during engine driving.

Figure 3:
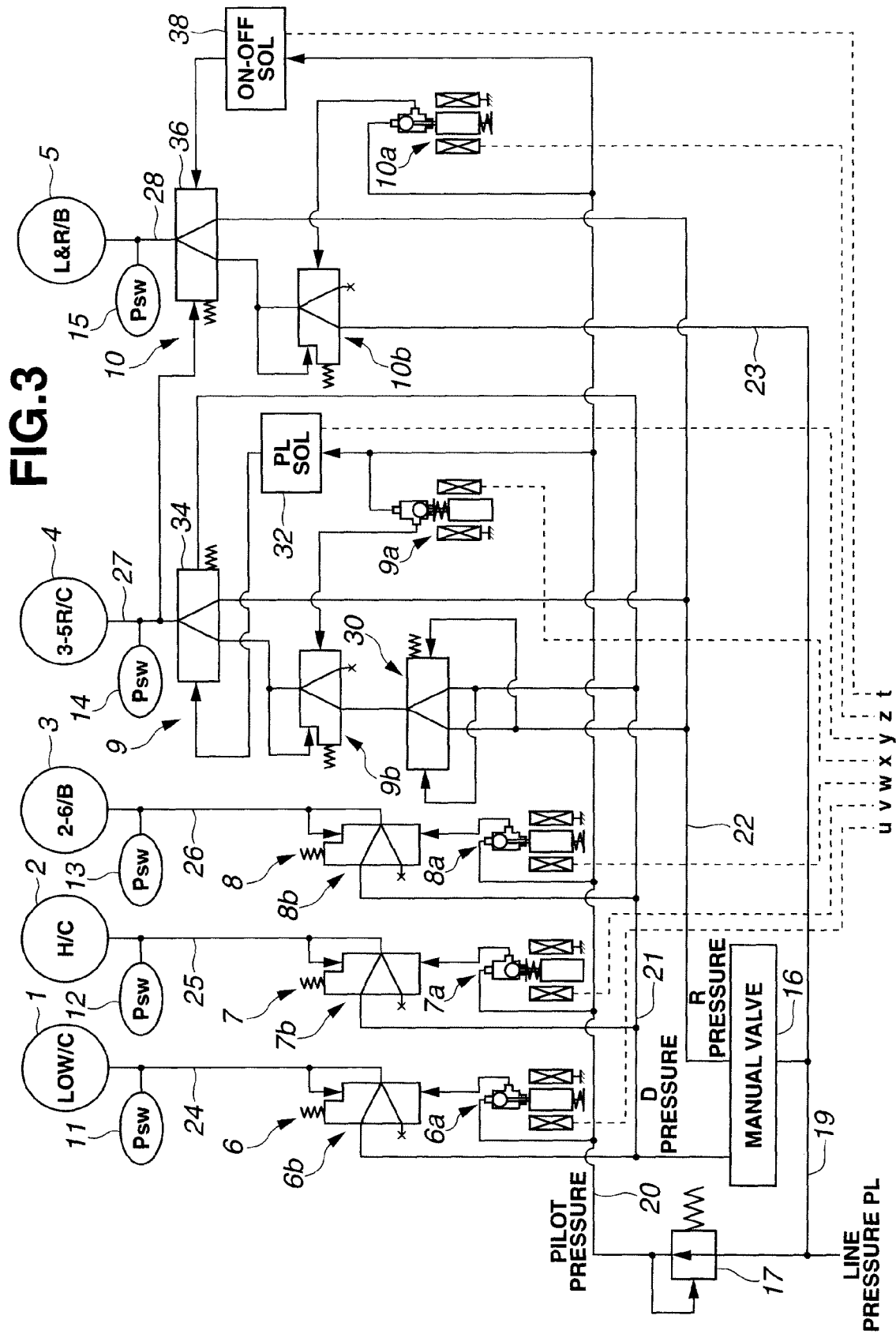
FIG. 3 is a view showing a hydraulic circuit and an electric shift control system of the automatic transmission.
Figure 4:
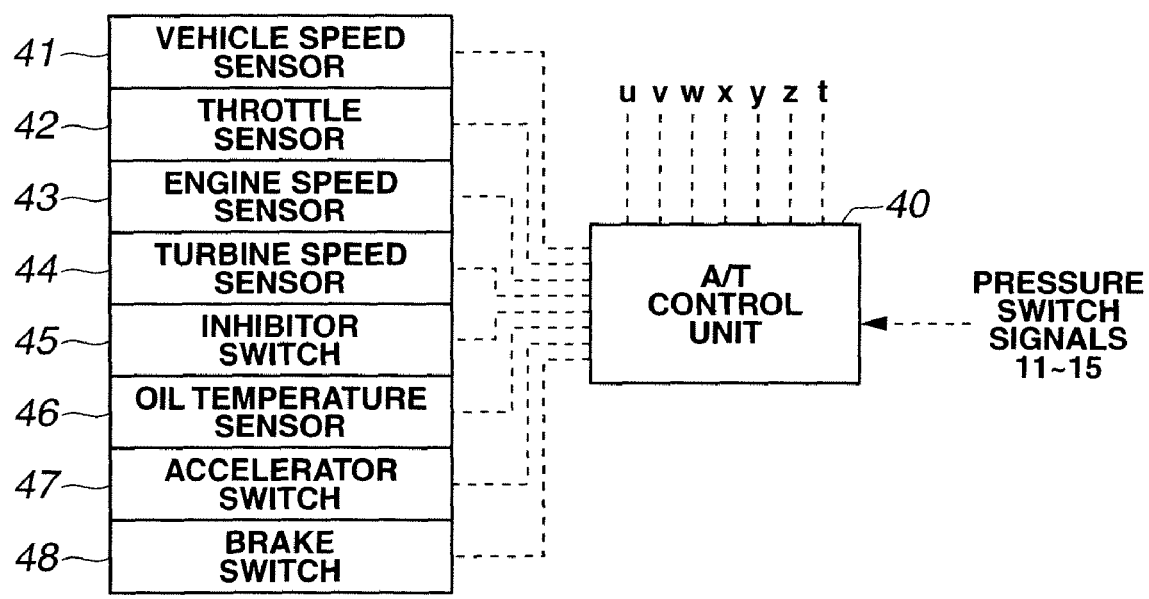
FIG. 4 is a view showing the hydraulic circuit and the electric shift control system of the automatic transmission.

Next, FIGS. 3 and 4 show a hydraulic circuit and an electric shift control system configured to perform the above-described shift control. Low clutch LOW/C, high clutch H/C, 2-6 brake 2-6/B, 3-5 reverse clutch 3-5R/C, and low and reverse brake L&R/B are engaged by supplying engagement pressures using D-range pressure or R-range pressure as source, to engagement piston chambers 15, and disengaged by releasing these engagement pressures. Besides, the D-range pressure is a line pressure obtained through a manual valve described later, and is generated only when the D-range is selected. The R-range pressure is a line pressure obtained through the manual valve, and is generated only when the R-range is selected. The R-range pressure is not generated by changeover to a drain port (not shown) when the R-range is not selected.

A first hydraulic control valve 6 controls an engagement pressure (a low clutch pressure) to an engagement piston chamber 1 of low clutch LOW/C. A second hydraulic control valve 7 controls an engagement pressure (a high clutch pressure) to an engagement piston chamber 2 of high clutch H/C. A third hydraulic control valve 8 controls an engagement pressure (a 2-6 brake pressure) to an engagement piston chamber 3 of 2-6 brake 2-6/B. A fourth hydraulic control valve 9 controls an engagement pressure (a 3-5 reverse clutch pressure) to an engagement piston chamber 4 of 3-5 reverse clutch 3-5R/C. A fifth hydraulic control valve 10 controls an engagement pressure (a low and reverse brake pressure) to an engagement piston chamber 5 of low and reverse brake L&R/B.

The D-range pressure from manual valve 16 is supplied through a D-range pressure hydraulic passage 21 to first-third hydraulic pressure regulating valves 6-8. Line pressure PL is supplied through a line pressure hydraulic passage 19 to manual valve 16.

First hydraulic control valve 6 includes a first duty solenoid 6a arranged to produce a shift control pressure by a solenoid force by using a pilot pressure as a source pressure; and a first pressure regulating valve 6b arranged to regulate the low clutch pressure by using the D-range pressure as the source pressure, and by using the shift control pressure and a feedback pressure as an operation signal pressure. First duty solenoid 6a is controlled in accordance with a duty ratio to set the low clutch pressure to zero at OFF state of the solenoid, and to increase the low clutch pressure at ON state of the solenoid as the ON duty ratio increases.

Second hydraulic control valve 7 includes a second duty solenoid 7a arranged to produce a shift control pressure by the solenoid force by using the pilot pressure as the source pressure; and a second pressure regulating valve 7b arranged to regulate the high clutch pressure by using the D-range pressure as the source pressure, and by using the shift control pressure and the feedback pressure as an operation signal pressure. Second duty solenoid 7a is controlled to set the high clutch pressure to zero at ON state of the solenoid (100% ON duty ratio), to increase the high clutch pressure as the ON duty ratio decreases, and to set the high clutch pressure to a maximum pressure at OFF state of the solenoid.

Third hydraulic control valve 8 includes a third duty solenoid 8a arranged to produce a shift control pressure by the solenoid force by using the pilot pressure as the source pressure; and a third pressure regulating valve 8b arranged to regulate the 2-6 brake pressure by using the D-range pressure as the source pressure, and by using the shift control pressure and the feedback pressure as an operation signal pressure. Third duty solenoid 8a is controlled to set the 2-6 brake pressure to zero at OFF state of the solenoid, and to increase the 2-6 brake pressure at ON state of the solenoid as the ON duty ratio increases.

Fourth hydraulic control valve 9 includes a fourth duty solenoid 9a arranged to produce a shift control pressure by the solenoid force by using the pilot pressure as the source pressure; a fourth pressure regulating valve 9b arranged to regulate an input pressure by using the shift control pressure and the feedback pressure as an operation signal pressure; and a shuttle valve 30 arranged to supply the D-range pressure to fourth pressure regulating valve 9b as the input pressure when the D-range is selected, and to supply the R-range pressure to fourth pressure regulating valve 9b as the input pressure when the R-range is selected. Moreover, fourth hydraulic control valve 9 includes a stall valve 34 arranged to output the output of fourth regulating valve 9b as the engagement pressure (3-5 reverse clutch pressure) to 3-5 reverse clutch 3-5R/C when the PLSOL pressure is low, and to output the R-range pressure directly as the engagement pressure when the PLSOL pressure is a predetermined high value, by using as a signal pressure, an output PLSOL pressure of a PL solenoid (PLSOL) 32 arranged to switch the pilot pressure between a high value and a low value, and by using the D-range pressure as a counter pressure to the output PLSOL pressure.

The output PLSOL pressure of PL solenoid 32 is usually set to the low value, fourth duty solenoid 9a controls fourth pressure regulating valve 9b to set the 3-5 reverse clutch pressure to zero at ON state of the solenoid (100% ON duty ratio), and to increase the 3-5 reverse clutch pressure as the ON duty ratio decreases. The 3-5 reverse clutch pressure is set to a maximum pressure at OFF state of the solenoid. On the other hand, in a case in which the PLSOL pressure is set to the high value, stall valve 34 outputs the R-range pressure as the engagement pressure, and accordingly 3-5 reverse clutch 3-5R/C is not in a state that the pressure is regulated, and becomes a state that is mechanically engaged.

Fifth hydraulic control valve 10 includes a fifth duty solenoid 10a arranged to produce a shift control pressure by the solenoid force by using the pilot pressure as the source pressure, and a fifth pressure regulating valve 10b arranged to regulate an output pressure by using the line pressure as the source pressure, and by using the shift control pressure and the feedback pressure as an operation signal pressure. Fifth hydraulic control valve 10 further includes a shift valve 36 arranged to switch between the output pressure of fifth pressure regulating valve 10b and the R-range pressure, by using as the signal pressure, the output of ON·OFF solenoid (ON·OFFSOL) 38 for switching the ON state and the OFF state of the pilot pressure, and by using the 3-5 reverse clutch pressure as the counter pressure to low and reverse brake L&R/B, and to supply one of the output pressure of fifth pressure regulating valve 10b and the R-range pressure to low and reverse brake L&R/B. ON·OFF solenoid 38 is arranged to be brought to the ON state at the D·N range, and to supply the pilot pressure to shift valve 36. ON·OFF solenoid 38 is arranged to be brought to the OFF state at the R-range. First-fifth duty solenoids 6a-10a are controlled by an A/T control unit 40 described later.

When the R-range is selected from the ranges other than the R-range, fifth duty solenoid 10a is brought to the OFF state by command from A/T control unit 40 to set the output of fifth pressure regulating valve 10b to zero. On the other hand, when the R-range is selected, ON·OFF solenoid 38 is brought to the OFF state, and shift valve 36 supplies the R-range pressure as the engagement pressure (the low and high reverse brake pressure) to low and reverse brake L&R/B. Moreover, a completion of the shift of the R-range is judged when the engagement of 3-5 reverse clutch 3-5R/C is finished, and fifth duty solenoid 10a is brought to the ON state. Accordingly, shift valve 36 is switched, the output pressure of fifth pressure regulating valve 10b is supplied as the engagement pressure to low and reverse brake L&R/B. The low and reverse brake pressure is increased as the ON duty ratio of fifth duty solenoid 10a is increased. Besides, ON·OFF solenoid 38 is brought to ON state when the range is switched form the R-range to the N-range, and low and reverse brake L&R/B is connected to fifth pressure regulating valve 10b. Accordingly, the engagement pressure of low and reverse brake L&R/B is regulated and released by the fifth pressure regulating valve 10b.

A first pressure switch 11 is provided in a low clutch pressure hydraulic passage 24 connecting first hydraulic control valve 6 and engagement piston chamber 1. A second pressure switch 12 is provided in a high clutch pressure hydraulic passage 25 connecting second hydraulic control valve 7 and engagement piston chamber 2. A third pressure switch 13 is provided in a 2-6 brake pressure hydraulic passage 26 connecting third hydraulic control valve 8 and engagement piston chamber 3. A fourth pressure switch 14 is provided in a 3-5 reverse clutch pressure hydraulic passage 27 connecting fourth hydraulic control valve 9 and engagement piston chamber 4. A fifth pressure switch 15 is provided in a low and reverse brake pressure hydraulic passage 28 connecting fifth hydraulic control valve 10 and engagement piston chamber 5. First-fifth pressure switches 11-15 respectively output the switch signals of ON state when there are the engagement pressures, and outputs the switch signals of OFF state when there are not the engagement pressures.

The electric shift control system includes an A/T control unit 40 receiving signals from a vehicle speed sensor 41, a throttle sensor 42, an engine speed sensor 43, a turbine speed sensor 44, an inhibitor switch 45, an oil temperature sensor 46, an accelerator switch 47, and brake switch 48. A/T control unit 40 receives switch signals from pressure switches 11-15. A/T control unit 40 starts operation when an ignition switch of the vehicle is brought to the ON state, and performs calculation based on the above-described input signals, predetermined shift control regulations, predetermined fail-safe control regulations and so on. In accordance with the result of the calculation operation, A/T control unit 40 outputs solenoid drive signals as engagement command or disengagement command, to first-fifth duty solenoids 6a-10a.

A/T control unit 40 further performs judgment of occurrence of failure in parallel with the above calculation. When A/T control unit 40 judges that there is caused a failure-induced disengagement that the frictional element to be engaged becomes the disengagement state, and a failure-induced engagement that the frictional elements to be disengaged becomes the engagement state during running, for failures of the valves and so on, A/T control unit 40 is brought to a limp home mode, and performs fail-safe control by commanding another gear stage. Moreover, A/T control unit 40 performs judgment of occurrence of the failure during stop of the vehicle.

Figure 5:
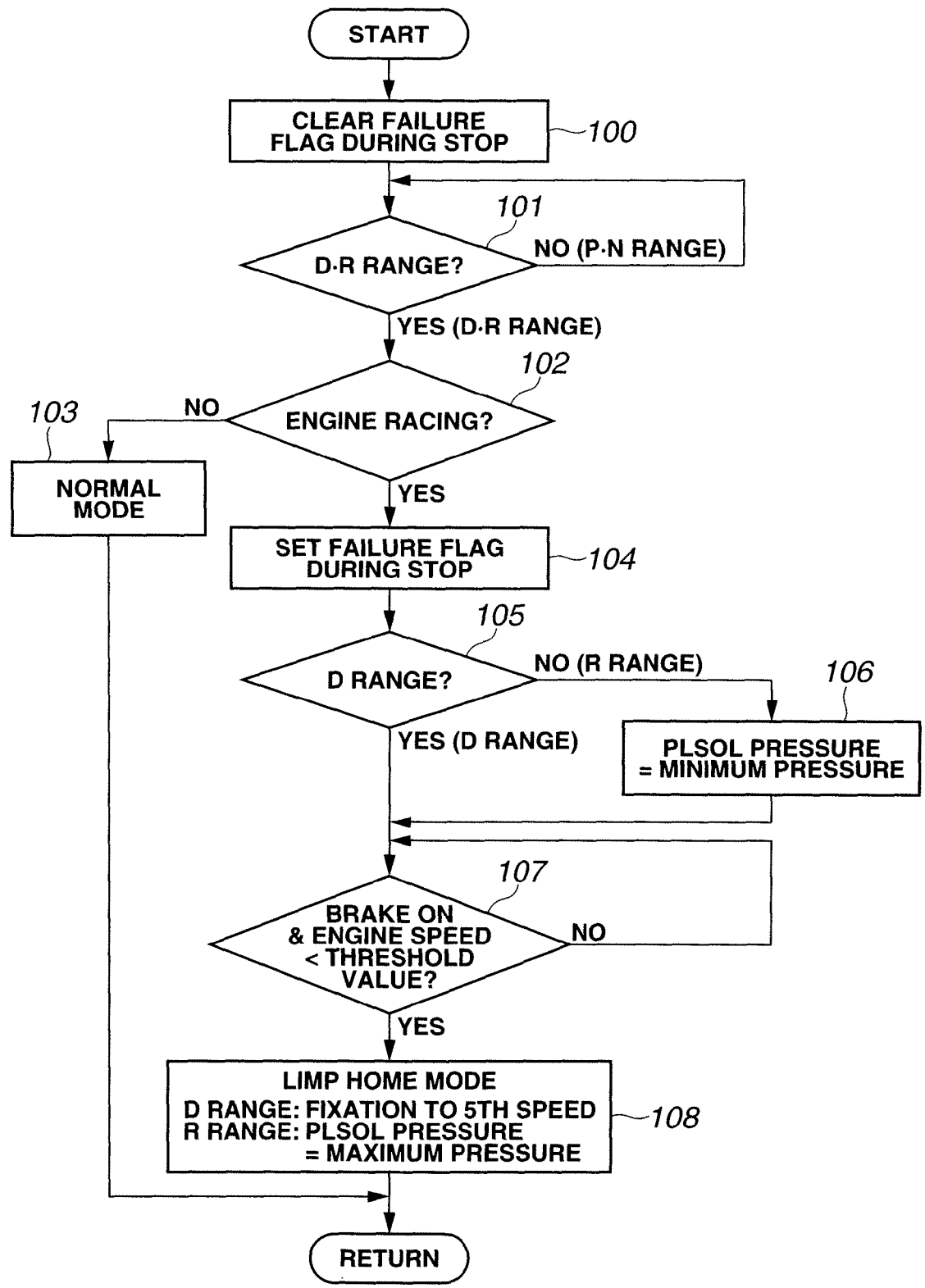
FIG. 5 is a flow chart showing a control operation of judgment of failure and control at failure, according to a first embodiment of the present invention.

Hereinafter, flow of the judgment of the occurrence of the failure in the frictional element during the stop of the vehicle and a control operation corresponding to the judgment in A/T control unit 40 will be illustrated. FIG. 5 is a flow chart showing a first embodiment according to the present invention. At step 100, A/T control unit 40 checks whether or not there is set a failure flag during the stop that represents generation of the neutral failure at previous stop of the vehicle when A/T control unit 40 senses a stop state after running by the input signal from vehicle speed sensor 41, and clears the flag when the flag is set.

At next step 101, A/T control unit 40 checks whether the select lever selects one of parking P and neutral N, or one of forward ranges (hereinafter, represented by the D-range) other than the parking P and the neutral N, and the R-range, by the input signal from inhibitor switch 45. The process proceeds to step 102 when the D-range or the R-range is selected.

At step 102, A/T control unit 40 judges whether or not there is caused an engine racing during a predetermined time period from time of detection of depression of the accelerator pedal by the signal from accelerator switch 47. In this case, A/T control unit 40 judges that the engine racing is generated in a case in which an engine speed from engine speed sensor 43 exceeds a predetermined value.

A/T control unit 40 judges that there is not generated the neutral failure in a case in which the engine does not race during the predetermined time period even when the accelerator pedal is depressed, and the process proceeds to step 103. A/T control unit 40 achieves the predetermined gear stage of selected D-range or R-range in accordance with normal control regulations. Accordingly, the vehicle is switched to the normal starting and running as the normal mode. On the other hand, A/T control unit 40 judges that there is generated the neutral failure when the engine races, and the process proceeds to step 104. At step 104, A/T control unit 40 sets the failure flag during the stop. At next step 105, A/T control unit 40 checks whether the select lever selects the R-range or the D-range. When the select lever selects the D-range, the process proceeds to step 107. When the select lever selects the R-range, the process proceeds to step 106. At step 106, A/T control unit 40 sets the PLSOL pressure to a predetermined minimum pressure when the output PLSOL pressure of PL solenoid 32 usually set to the low value is the high value, and the process proceeds to step 107.

The driver depresses a brake pedal when the engine speed is increased by the racing. When the failure flag during the stop is set, at step 107, A/T control unit 40 judges whether the engine speed is smaller than a predetermined threshold value by depression of the brake pedal, by the signals from brake switch 48 and engine speed sensor 43. In a case in which A/T control unit 40 judges that the engine speed is smaller than the predetermined threshold value, the process proceeds to step 108, and the A/T control unit 40 is switched to the limp home mode.

In a case in which there is caused neutral at the starting at the D-range, low clutch LOW/C to be engaged at the low gear stages of the first speed 1st and the second speed 2nd is disengaged by the failure. Accordingly, in this limp home mode, the command of the gear stage is fixed at the fifth speed 5th which has a largest gear ratio in the gear stages which can be attained without the engagement of low clutch LOW/C. That is, for attaining this fifth speed 5th, A/T control unit 40 outputs command of the engagement of high clutch H/C, and command of the engagement of reverse clutch 3-5R/C.

In a case in which there is caused neutral for the failure of the solenoid at the R-range, 3-5 reverse clutch 3-5R/C is disengaged by the failure of fourth duty solenoid 9a. Besides, low and reverse brake L&R/B is also the frictional element to be engaged at the R-range. However, A/T control unit 40 controls ON·OFF solenoid 38 to be the OFF state, and the low and reverse brake L&R/B is engaged by receiving the supply of the R-range pressure by shift valve 36. Accordingly, there is not caused the neutral by the failure of fifth duty solenoid 10a for regulating the pressure.

In case of the failure-induced disengagement of 3-5 reverse clutch 3-5R/C, the output PLSOL pressure of PL solenoid 32 is set to a predetermined high value. Consequently, there is not generated the output from fourth pressure regulating valve 9b by the control of fourth duty solenoid 9a, and however stall valve 34 is switched to output the R-range pressure as the 3-5 reverse clutch pressure. Accordingly, 3-5 reverse clutch 3-5R/C is engaged, and the reverse gear speed (Rev) is attained.

Besides, after the vehicle is started at the R-range, it is possible to fix the fourth speed 4th and so on of the gear stages which can be attained without the engagement of 3-5 reverse clutch 3-5R/C for the D-range. Consequently, it is possible to perform the starting of the vehicle at the D-range and at the R-range by the limp home mode, and to run the vehicle to the service point. The judgment of the failure of the frictional element during the stop and the corresponding control operation are finished, and the above-described flow is repeated when the vehicle stops again after the running.

In this control operation, the failure flag during the stop is cleared at step 100. Even in a case in which the judgment of the neutral failure by the check of the engine racing at step 102 is a fault (error) detection, the judgment of the failure of the frictional element goes back at every operation, and accordingly the fault detection state is not continued after the vehicle stops again.

Moreover, when the R-range is selected, the output PLSOL pressure of PL solenoid 32 is set to the predetermined minimum pressure at step 106, and accordingly it is possible to prevent stall valve 34 from directly supplying the R-range pressure to engage 3-5 reverse clutch 3-5R/C, and to prevent the vehicle from suddenly starting by the large depression of the accelerator pedal.

Besides, inhibitor switch 45 outputs the signal indicative of the position of the select lever. However, the D-range pressure may be not generated since manual valve 16 forming the hydraulic circuit is not switched yet, despite of the signal indicative of the D-range from inhibitor switch 45. This state is referred to a pseudo D-state. In this pseudo D-state, there is also generated the engine racing at the depression of the accelerator pedal, and the vehicle can not start, despite that first duty solenoid 6a and so on are normal.

In the case of the engine racing, A/T control unit 40 is brought to the limp home mode by the above-described control operation. In a case in which the above-described pseudo-D-state continues, the engine racing is generated when the accelerator pedal is depressed again, and the vehicle can not be started. However, in this case, the driver judges vehicle malfunction, and performs a series of the operations including the operation of the select lever. Consequently, the control apparatus can get out of the pseudo D-state. Accordingly, even in the case in which the vehicle can not run for the pseudo D-state, the vehicle can finally run by the limp home mode set first.

In this embodiment, the D-range corresponds to the forward range, and the R-range corresponds to the reverse range. In the flow chart of FIG. 5, step 102 checks the engine racing in the state in which the D-range or the R-rage is selected, and forms a failure occurrence detection section. Step 108 commands the limp home mode, and forms a command output section. Moreover, stall valve 34 switches the output pressure of pressure regulating valve 9b and the R-range pressure, and corresponds to a switching valve. The R-range pressure corresponds to a predetermined pressure that does not pass through the valve for regulating the pressure.

In the control apparatus according to the embodiment of the present invention, the control apparatus includes the frictional elements of low clutch LOW/C, high clutch H/C, 2-6 brake 2-6/B, 3-5 reverse clutch 3-5R/C, and low and reverse brake L&R/B are arranged to be engaged, respectively, by receiving the supply the output pressures regulated by first-fifth pressure regulating valves 6b-10b by using, as the operation signal pressures, the shift control pressures generated in first-fifth duty solenoids 6a-10a. The automatic transmission for the vehicle attains the plurality of the gear stages by the combination of the engagements of the frictional elements. The controller is configured to detect the occurrence of the failure-induced disengagement of the frictional element caused by the solenoid failure, based on the engine racing caused by the depression of the accelerator pedal in the state that the D-range or the R-range is selected during the stop of the vehicle. Accordingly, it is possible to detect the failure-induced disengagement generated during the stopping, and to bring to the limp home mode in response to the detection of the failure-induced disengagement to start the vehicle.

When the engine racing is generated in the state that the D-range is selected, the controller judges the failure-induced disengagement of the low clutch LOW/C, and outputs the command of the limp home mode to attain the fifth speed 5th which can be achieved by engaging the frictional elements other than low clutch LOW/C. Accordingly, it is possible to readily start the vehicle by the fifth speed 5th which can gain the maximum start torque, and which has a largest gear ratio in the avoidance gear stages.

Moreover, stall valve 34 is arranged to switch the output pressure of pressure regulating valve 9b and the R-range pressure which does not pass through pressure regulating valve 9b, and to be supplied to 3-5 reverse clutch 3-5R/C to be engaged at the R-range. In the case of the occurrence of the engine racing in the state that the R-range is selected, the controller judges the failure-induced disengagement of 3-5 reverse clutch 3-5R/C, and switches stall valve 34 to supply the R-range pressure which does not pass through pressure regulating valve 9b to engage 3-5 reverse clutch 3-5R/C. Consequently, it is possible to start the vehicle at the R-range.

The command of the limp home mode in the state that the R-range is selected is outputted after the engine speed is lower than the predetermined threshold value. Accordingly, it is possible to prevent the sudden start of the vehicle by the engagement of 3-5 reverse clutch 3-5R/C. Moreover, the controller is arranged to clear, at every stop of the vehicle, the failure flag during the stop which is set upon the detection of the occurrence of the failure-induced disengagement. Consequently, this fault detection state does not continue after the vehicle stops again.

Figure 6:
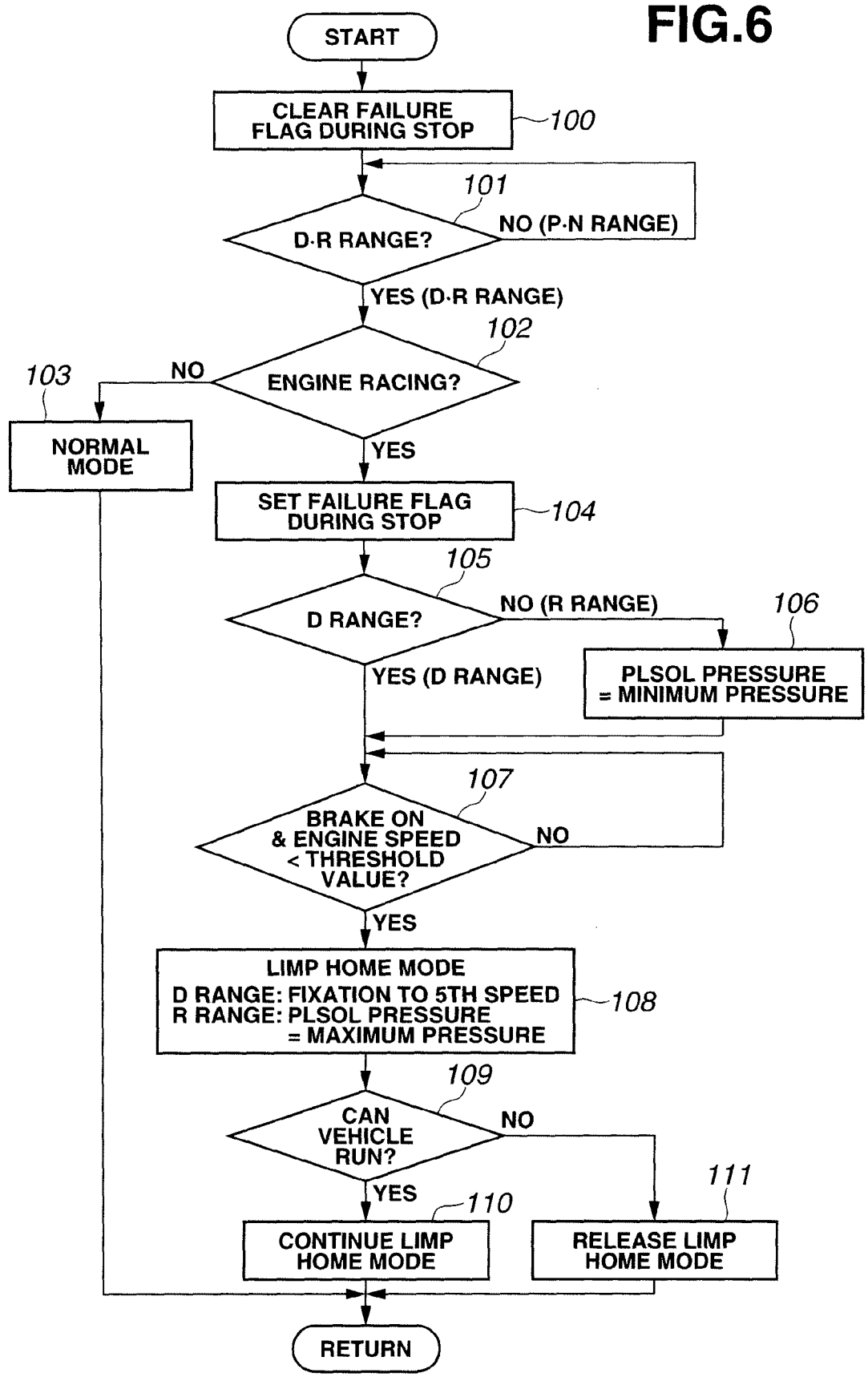
FIG. 6 is a flow chart showing a control operation of judgment of failure and control at failure, according to a second embodiment of the present invention.

Next, a second embodiment according to the present invention will be illustrated. The control operation according to the second embodiment corresponds to a control operation that further control steps are added to the control operation of the judgment of the failure of the frictional element during the stop in the first embodiment. FIG. 6 is a flow chart showing the second embodiment according to the present invention. The control operation from step 100 to step 108 of FIG. 6 is identical to the control operation from step 100 to step 108 of the first embodiment in FIG. 5, and the explanations from step 100 to step 108 are omitted. After A/T control unit 40 is brought to the limp home mode at step 108, A/T control unit 40 checks whether or not the vehicle can run at step 109 in the second embodiment of the present invention. That is, the A/T control unit 40 checks whether or not the vehicle speed is varied, based on the input signal from vehicle sensor 41. In a case in which the vehicle speed is varied to start the vehicle, the process proceeds to step 110, and A/T control unit 40 continues the limp home mode.

In the case of the selection of the D-range, the gear stage which can be attained without engaging low clutch LOW/C of the failure-induced disengagement is selected in the limp home mode. When the vehicle can not start in this case, it is unthinkable that two or more the frictional elements become the failure-induced disengagement concurrently. Accordingly, it is thinkable that the vehicle can not start in this case for the above-described pseudo D-state. In this case, the process proceeds from step 109 to step 111, and the limp home mode is released to return to the normal mode. Consequently, after A/T control unit 40 is released from the pseudo D-state by the reoperation of the select lever, A/T control unit 40 returns to the normal mode. Accordingly, it is possible to attain appropriate driving characteristic in accordance with the driving state, and to perform comfortable running.

In this embodiment, the D-range corresponds to the forward range, and the R-range corresponds to the rearward range. Stall valve 34 arranged to switch the output pressure of pressure regulating valve 9b and the R-range pressure corresponds to the switching valve. The R-range pressure corresponds to the predetermined pressure that does not pass through the pressure regulating valve. In the flow chart of the FIG. 6, step 102 checks whether or not the engine racing is generated in the state that the D-range or the R-range is selected, and corresponds to the failure generation sensing section. Step 108 configured to command the limp home mode corresponds to the command output section. Moreover, step 109 configured to check whether or not to run the vehicle corresponds to the running sensing section. Step 111 configured to return to the normal mode by releasing the limp home mode corresponds to the limp home mode release section.

In the control apparatus according to the second embodiment, the controller judges the failure-induced disengagement of the frictional element when the vehicle can not run by the engine racing, and is brought to the limp home mode. At step 109, A/T control unit 40 judges that the vehicle can not run for the pseudo D-state. Subsequently to step 109, the limp home mode is released at step 111. In the first embodiment, the select lever is reoperated to release from the pseudo D-state, and consequently the vehicle can run at the gear stage which is fixed in the limp home mode. In the second embodiment, the limp home mode is released to return to the normal mode, and the vehicle can run at the appropriate gear stage corresponding to the various driving conditions after the vehicle is released from the pseudo D-state. The control operation according to the second embodiment can attain the same effect as the control operation according to the first embodiment.

Besides, in the first and second embodiments, the engagement pressures supplied to the frictional elements of low clutch LOW/C, high clutch H/C, 3-5 reverse clutch 3-5R/C, 2-6 brake 2-6/B, and low and reverse brake L&R/B are, respectively, the output pressures regulated by pressure regulating valves 6b-10b by using, as the operation signal pressures, the shift control pressures 30 generated by solenoids 6a-10a. However, the present invention is not limited to this structure. It is optional to employ a hydraulic circuit to supply, as the engagement pressure, the output pressure regulated by the solenoid itself without passing though the pressure regulating valve.

This application is based on a prior Japanese Patent Application No. 2006-241431. The entire contents of the Japanese Patent Application No. 2006-241431 with a filing date of Sep. 6, 2006 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for an automatic transmission of a vehicle, the automatic transmission including a plurality of frictional elements each arranged to be engaged by receiving supply of an engagement pressure regulated by a solenoid, the automatic transmission being arranged to attain a plurality of gear stages by combination of engagements of the frictional elements, the control apparatus comprising:
   a failure occurrence sensing section configured to sense an occurrence of a failure-induced disengagement in one of the frictional elements based on a failure of one of the solenoids, based on an engine racing by a depression of an accelerator pedal in a state in which it is determined whether one of a forward range and a reverse range is selected during a stop of the vehicle; and
   a command output section configured to output a limp home mode command to attain one of the gear stages to enable the vehicle to start at the time of the occurrence of the failure-induced disengagement.

2. The control apparatus as claimed in claim 1, wherein the failure occurrence sensing section is configured to sense the occurrence of the failure-induced disengagement of the one of the frictional elements based on the failure of the one of the solenoids, based on the engine racing by the depression of the accelerator pedal in a state in which the reverse range is selected during the stop of the vehicle; and the control apparatus further comprises a switching valve arranged to switch from the engagement pressure regulated by the solenoid to a predetermined pressure which is not regulated by the solenoid, and to supply the predetermined pressure to the one of the frictional elements of the failure-induced disengagement based on the failure of the one of the solenoids; and the command output section is configured to output the limp home mode command to switch the switching valve to supply the predetermined pressure which is not regulated by the one of the solenoids to the one of the frictional elements of the failure-induced disengagement at the time of the occurrence of the failure-induced disengagement, so as to attain the reverse range.

3. The control apparatus as claimed in claim 1, wherein the control apparatus further comprises a running sensing section configured to sense whether or not the vehicle can run after the command output section outputs the limp home mode command, and a limp home mode releasing section configured to release the limp home mode when the vehicle can not run.

4. The control apparatus as claimed in claim 1, wherein the failure occurrence sensing section is configured to set a failure flag during the stop when the failure occurrence sensing section senses the failure-induced disengagement of the one of the frictional elements; the command output section is configured to output the limp home mode command based on the failure flag during the stop; and the failure occurrence sensing section is configured to clear the failure flag during the stop at a next stop of the vehicle.

5. A control apparatus for an automatic transmission of a vehicle, the automatic transmission including solenoids each arranged to generate a shift control pressure, pressure regulating valves each arranged to regulate an engagement pressure by using the shift control pressure from one of the solenoids as an operation signal pressure, and a plurality of frictional elements each arranged to be engaged by receiving supply of the engagement pressure from the one of the pressure regulating valves, the automatic transmission being arranged to attain a plurality of gear stages by combination of engagements of the frictional elements, the control apparatus comprising:
  a failure occurrence sensing section configured to sense an occurrence of a failure-induced disengagement in one of the frictional elements based on a failure of one of the solenoids, based on an engine racing by a depression of an accelerator pedal in a state in which it is determined whether one of a forward range and a reverse range is selected during a stop of the vehicle; and
  a command output section configured to output a limp home mode command to attain one of the gear stages to enable the vehicle to start at the time of the occurrence of the failure-induced disengagement.

6. The control apparatus as claimed in claim 5, wherein the failure occurrence sensing section is configured to sense the occurrence of the failure-induced disengagement in the one of the frictional elements based on the failure of the one of the solenoids, based on the engine racing by the depression of the accelerator pedal in a state in which the forward range is selected during the stop of the vehicle; and the command output section is configured to output the limp home mode command to attain the one of the gear stages by engagements of the frictional elements other than the one of the frictional elements of the failure-induced disengagement at the time of the occurrence of the failure-induced disengagement.

7. The control apparatus as claimed in claim 5, wherein the failure occurrence sensing section is configured to sense the occurrence of the failure-induced disengagement in the one of the frictional elements based on the failure of the one of the solenoids, based on the engine racing by the depression of the accelerator pedal in a state in which the reverse range is selected during the stop of the vehicle; the control apparatus further includes a switching valve arranged to switch from the engagement pressure of the one of the pressure regulating valves to a predetermined pressure which is not regulated by the one of the pressure regulating valves, and to supply the predetermined pressure to the one of the frictional element of the failure-induced disengagement based on the failure of the one of the solenoids; and the command output section is configured to output the limp home mode command to switch the switching valve to supply the predetermined pressure which is not regulated by the one of the solenoids to the frictional element of the failure-induced disengagement at the time of the occurrence of the failure-induced disengagement, so as to attain the reverse range.

8. The control apparatus as claimed in claim 7, wherein the command output section is configured to output the limp home mode command after an engine speed becomes smaller than a predetermined threshold value in the state in which the reverse range is selected.

9. The control apparatus as claimed in claim 5, wherein the control apparatus further comprises a running sensing section configured to sense whether or not the vehicle can run after the command output section outputs the limp home mode command, and a limp home mode releasing section configured to release the limp home mode when the vehicle can not run.

10. The control apparatus as claimed in claim 5, wherein the failure occurrence sensing section is configured to set a failure flag during the stop when the failure occurrence sensing section senses the failure-induced disengagement of the one of the frictional elements; the command output section is configured to output the limp home mode command based on the failure flag during the stop; and the failure occurrence sensing section is configured to clear the failure flag during the stop at a next stop of the vehicle.

11. A control method for an automatic transmission of a vehicle, the automatic transmission including solenoids each arranged to generate a shift control pressure, pressure regulating valves each arranged to regulate an engagement pressure by using the shift control pressure from one of the solenoids as an operation signal pressure, and a plurality of frictional elements each arranged to be engaged by receiving supply of the engagement pressure from the one of the pressure regulating valves, the automatic transmission being arranged to attain a plurality of gear stages by combination of engagements of the frictional elements, the control method comprising:
  sensing an occurrence of a failure-induced disengagement in one of the frictional elements based on a failure of one of the solenoids, based on an engine racing by a depression of an accelerator pedal in a state in which it is determined whether one of a forward range and a reverse range is selected during a stop of the vehicle; and
  outputting a limp home mode command to attain one of the gear stages to enable to the vehicle to start at the time of the occurrence of the failure-induced disengagement.

* * * * *